INVENTORS
WILLIAM F. BANKAUF
ROBERT M. PROMIN
BY
ATTORNEY

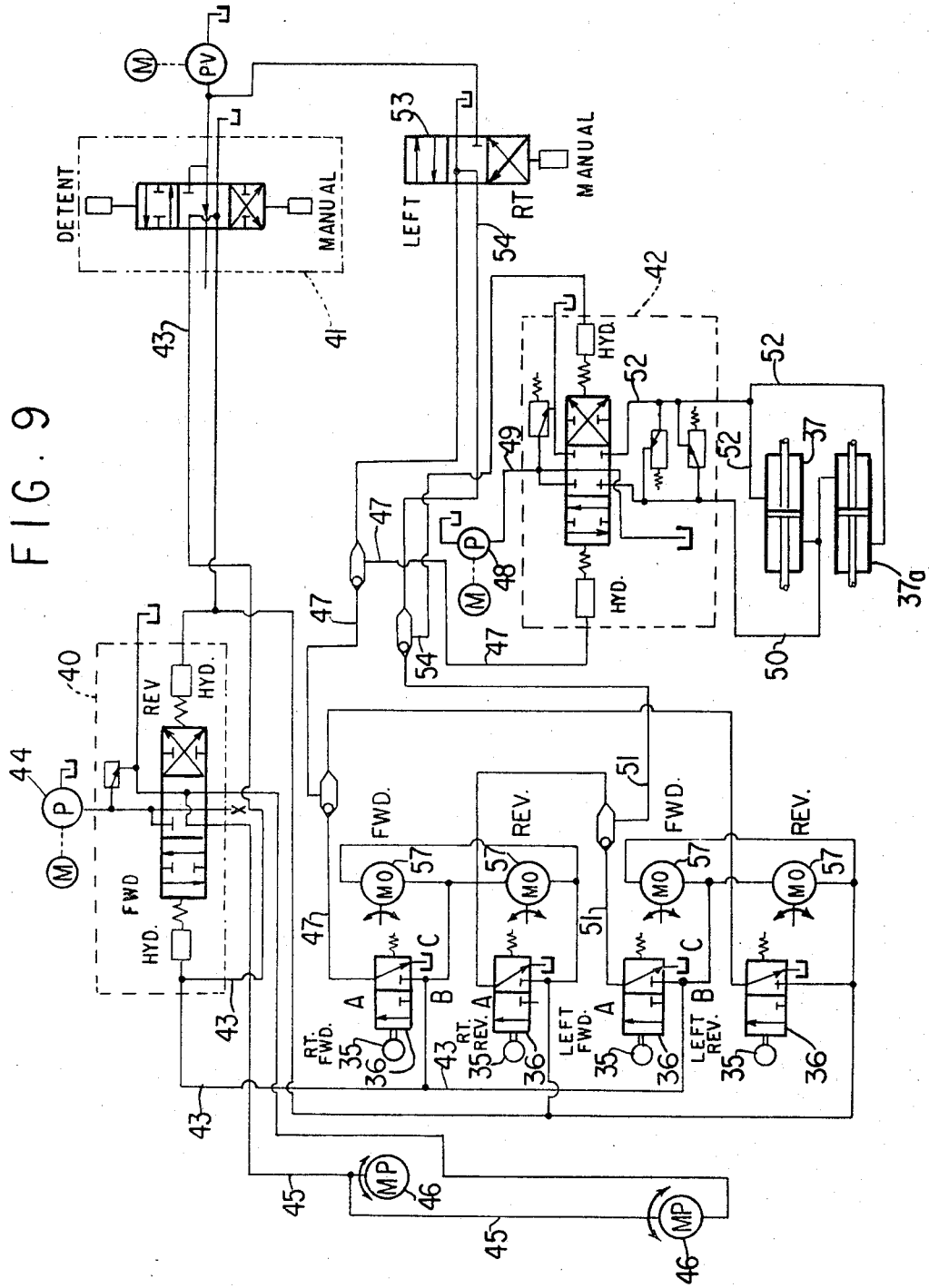

United States Patent Office 3,422,949
Patented Jan. 21, 1969

3,422,949
MOBILE BRIDGE CONVEYOR STEERING
SYSTEM
William F. Bankauf, East Paterson, and Robert M.
Promin, Clifton, N.J., assignors to Hewitt-Robins
Incorporated, Stamford, Conn.
Filed Feb. 28, 1967, Ser. No. 619,220
U.S. Cl. 198—92                 10 Claims
Int. Cl. B65g 37/00; B62d 5/08

ABSTRACT OF THE DISCLOSURE

A steering system for a mobile bridge conveyor having sensing rollers which sense any misalignment of the bridge conveyor as it moves over an extensible conveyor and a hydraulic system which is actuated in response to the signal in order to turn a pair of steerable wheels and thereby correct for the misalignment.

---

This invention relates to an improved bridge conveyor apparatus for use in underground or open pit mining of coal, potash, etc. and, more particularly, to a steering system for a mobile bridge conveyor.

In underground mining a movable boring or mining machine is used to cut out the bulk material from the solid ore body, which material must then be removed from the mine. A continuous conveyor system, which may be 2000 to 3000 feet long, is used for this purpose. However, main or panel belt continuous conveyors, although they can be lengthened or shortened, cannot be directly connected with the mining machine since the mining machine is constantly moving and is often at a sharp angle with the conveyors. For these reasons shuttle cars were heretofore used to link the mining machine with the continuous conveyor system. More recently, movable bridging conveyor apparatus has been developed to link the latest high capacity mining machines with a section of a high capacity continuous conveyor system. One bridging conveyor apparatus consists of two or more discrete bridge conveyors, each of which is self-propelled and has driven tramming wheels which can be turned for steering. Each discrete bridge conveyor is pivotally connected with the next adjacent bridge conveyor. One position that each of the discrete bridge conveyors must assume is an overlying relationship with a section of the continuous conveyor system. That is, it must be possible to move the bridging conveyors along the continuous conveyor sections for any desired distance so that the mining machine has complete flexibility of movement. Thus, when the mining machine must be backed out of one entry and moved to another entry the bridging conveyor must also back up and extend in an overlying position with the continuous conveyor system or a number of its sections. Movement of each of the bridge conveyors as a unit, and individually, is controlled by an operator, but in the overlying position of a bridge conveyor with a continuous, fixed conveyor, the operator must continually check the alignment of the bridge conveyor sections with the continuous conveyor system. According to this invention, alignment of each bridge conveyor and continuous conveyor system is automatically maintained and, therefore the operator need only bring each of the bridge conveyors into the initial overlying position with the sections of the continuous conveyor system and the correct alignment is maintained automatically thereafter.

According to the invention, the steerable tramming wheels of the bridging conveyor are each provided with sensing apparatus for automatically steering the associated bridge conveyors for maintaining alignment with a continuous conveyor system.

One object of the invention therefore is to provide apparatus for stering a vehicle along a fixed path.

Another object of the invention is to provide apparatus for automatically maintaining a bridge conveyor in alignment with one or more sections of a continuous conveyor while the bridge conveyor moves along and over the continuous conveyor.

A further object of the invention is to provide an automatic steering assembly for a bridge conveyor, or the like, which detects and corrects for errors in direction of movement of the mobile bridge conveyor as it moves over a continuous conveyor.

Still a further object is to provide an apparatus for steering a self-propelled bridge conveyor that is straddling a continuous conveyor and which apparatus includes a hydraulic steering system that is actuated only when the bridge conveyor and the continuous conveyor are misaligned.

Other objects, advantages and novel features of the present invention will become apparent from the following detailed description of the invention when considered in conjunction with the accompanying drawings wherein;

FIGURE 9 is a schematic of the hydraulic system of the automatic steering unit of FIGURE 5.

Figure 1:
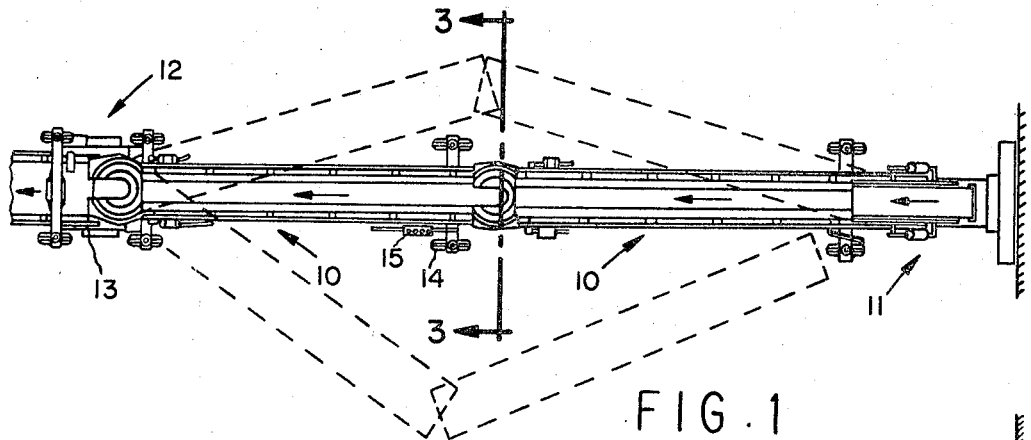
FIGURE 1 is a schematic partial plan view of a number of sections of a bridging conveyor system.
Figure 2:
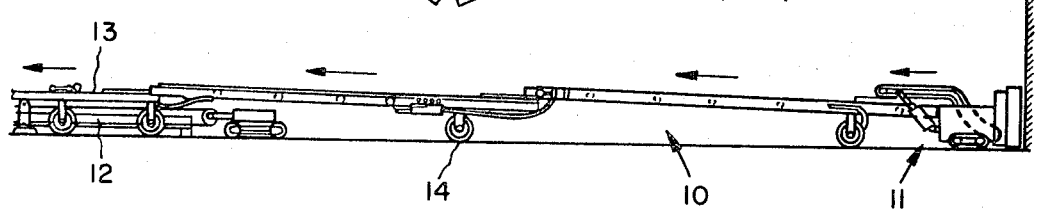
FIGURE 2 is a side view of the apparatus shown in FIGURE 1.

In FIGURES 1 and 2 a bridging conveyor system generally designated 10 is shown between a mining machine 11 and one end of a continuous extendable belt conveyor 12. As indicated in broken lines of FIGURE 1 the two bridge conveyor sections shown are pivotal relative to one another. Whenever it is necessary to extend the conveyor 12 or relocate the mining machine 11 the bridge conveyors 10 are moved into an overlying position with the relatively fixed continuous conveyor 12. A dolly 13 receiving material from the string of bridge conveyor 10 is provided with two pair of tramming wheels both of which are steerable. Each bridge conveyor section is likewise provided with a pair of steerable tramming wheels 14. The bridge conveyors and dolly may all be manually controlled from a single control console 15 which is of known design and construction. However, the dolly 13 and each bridge section may also be provided with an associated control panel so that they are individually operated.

Figure 3:
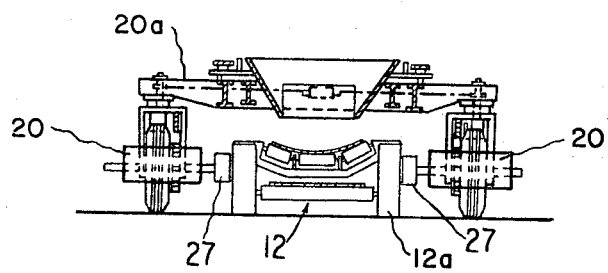
FIGURE 3 is a cross sectional view taken on line 3—3 of FIGURE 1.
Figure 4:
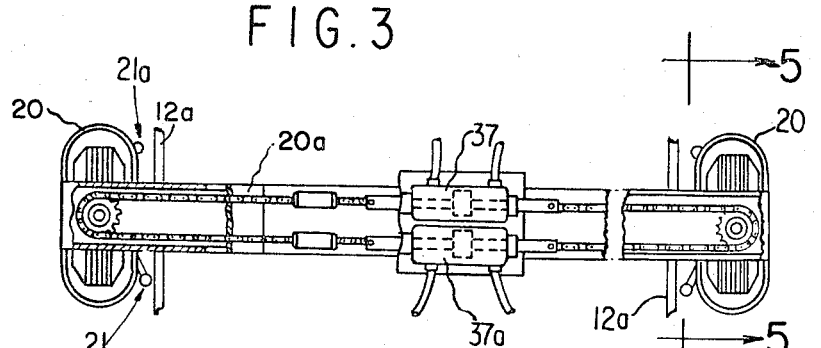
FIGURE 4 is a somewhat schematic, partial plan view illustrating the hydraulic steering mechanism for the bridge conveyor tramming wheels.

While only two bridge conveyors are shown in FIGURES 1 and 2 as many as five bridge conveyors may be required to link the mining machine 11 and the continuous conveyor 12. When such a long chain of bridge conveyors are retracted from an entry each bridge conveyor must track over the conveyor 12 accurately as shown in FIGURE 3. For this purpose, each of the tramming wheels 14 is encircled with a ring or yoke 20 as shown in FIGURES 3–6. The yoke 20 is pivotally attached to the frame 20a of the associated bridge conveyor by suitable upright members so that the yoke and wheel are turned as a unit for steering purposes. Any suitable swivel joint may be used to connect the frame 20a of a bridge conveyor and the yoke 20. Each of the tramming wheels on opposite sides of each conveyor unit are steerable in unison by, for example, a chain and sprocket drive interconnecting both yokes and controlled by hydraulic cylinders 37, 37a as will hereinafter be described.

In the preferred embodiment of this invention each yoke is provided with a guide follower means consisting of a forward guide follower linkage system 21 and reverse guide follower linkage system 21a. Since both follower linkage systems are the same only one will be described in detail. Each follower linkage system includes a first lever 22 and a second lever 23 both pivotally secured to the wheel yoke. The first lever 22 is made up of an upper arm 24 and lower arm 25 rotatably mounted on either side of the yoke and a shield plate 26 securely attached to both arms. A roller 27 is rotatably supported between the two arms 24, 25 and is adapted to come into contact with the guide rail 12a. Projecting from the upper arm 24 is a pin 28 which rides in a curved slot 29 formed in the second lever 23 such that pivotal movement in one direction of one lever causes pivotal movement in the opposite direction of the other lever. The second lever 23 is fixed to shaft 30 which is rotatably mounted in hubs formed on the wheel yoke. A spring collar 31 is attached to the shaft. A spring 32 surrounds a portion of shaft 30 and is connected to both the spring collar and the wheel yoke so that rotation of the second lever 23 tensions the spring which, in turn, urges the second lever back into its normal extended position, as shown by the forward linkage system 21 in FIG. 6. A plate 33 having a cam surface 34 formed thereon is attached to shaft 30 so that the cam rotates in response to movement of the associated linkage system. The cam 34 is contacted by a roller-type cam follower 35 which operates a valve 36 mounted on the wheel yoke. Projecting from the plate 33 is a pin 38 which is contacted by arm 39 of a fluid operated rotary actuator 57 mounted on the wheel yoke. The rotary actuator is adapted to rotate the second lever 23 against the spring force of spring 32 so that the entire linkage system can be retracted when not in use, as will be hereinafter described. In operation cam 34 will operate valve 36 only when the bridge conveyor is misaligned with the extensible conveyor such that the roller 27 is driven into rail 12a causing actuation of the linkage system. Actuation of valve 36 delivers hydraulic fluid under pressure to steering cylinders 37, 37a which turns the interconnected yokes. The forward linkage system actuates the steering cylinders only when the bridge conveyor is moving to the left, as viewed in FIG. 5, and the reverse linkage system 21a actuates the steering cylinders only when the bridge conveyor is moving to the right. Thus, the pair of linkage follower systems associated with each steerable wheel yoke provides a guide follower means which extends in front of the wheel, regardless of the direction in which the wheel is moving.

The schematic diagram of the hydraulic system which controls both tramming direction and steering control is shown in FIG. 9. The tram control valve 41 is the main control valve which is manually actuated and which, as indicated, has a detent-type locking means for holding the valve in a selected position. The manual actuation of the tramming control valve 41 actuates the tram power valve 40 in order to have pump 44 drive the wheel turning motors 46 in either a forward or reverse direction depending upon the position of valve 41. Actuation of the tram control valve 41 also supplies hydraulic fluid under pressure to the proper wheel guiding valves 36 and to the rotary actuators 57. Thus, when the tram control valve 41 is moved down as shown in FIG. 9 for forward movement of the bridge conveyor, pump PV supplies fluid under pressure via line 43 to tram power valve 40. The power valve moves to the right permitting pump 44 to deliver fluid via line 45 to the motors 46 for driving the bridge conveyor in a forward direction. At the same time, hydraulic fluid under pressure is delivered via line 43 to each valve port B of the right and left forward guide valves and to the rotary actuators 57. The forward rotary actuators are pivoted in one direction in order to permit the forward follower linkage systems to be urged into a normal extended position by their springs 32 and the reverse rotary actuators are pivoted in the opposite direction in order to permit the reverse follower linkage systems to be retracted by the pivotal action of arms 39 acting against the pins 38 (see FIG. 5). When the direction of travel for the bridge conveyor is reversed, the direction of each of the rotary actuators are reversed so that the forward follower linkage systems are retracted and the reverse follower linkage systems are extended into an operative position. Thus, the system of rotary actuators provide a means for controlling the guide follower means such that the operative follower linkage system always leads or is in front of the wheels 14 and such that the inoperative linkage system is always in a retracted position.

Figure 8:
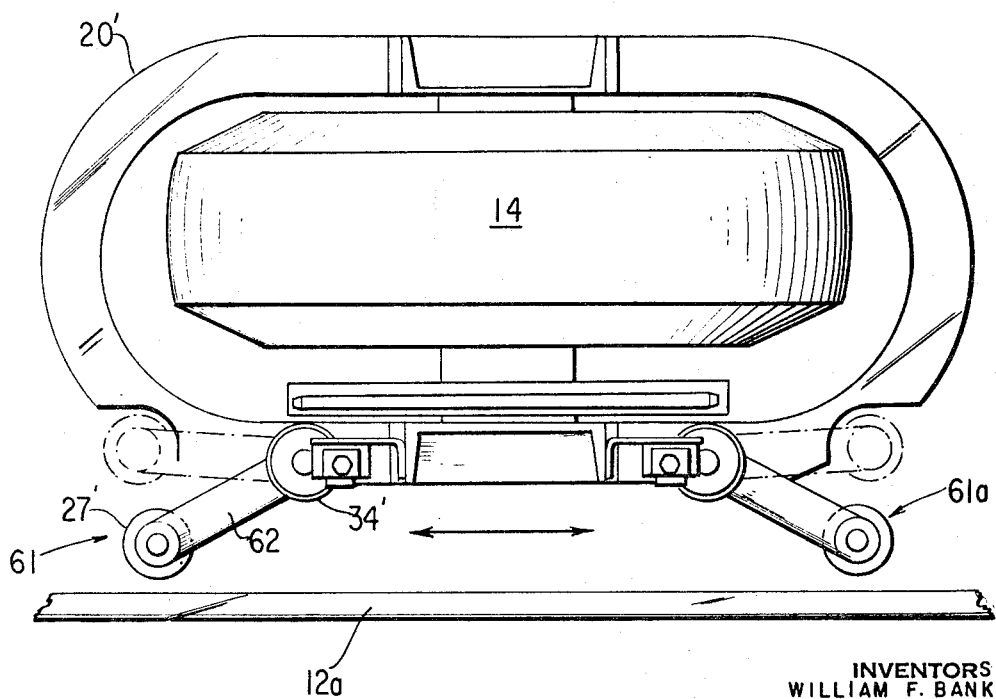
FIGURE 8 is top view of the steering unit shown in FIGURE 7.

If, while the bridge conveyor is moving forward, the roller on the right forward linkage system contacts the side rail of the continuous conveyor, the associated guide valve 36 moves to the right as seen in FIG. 9 and fluid under pressure is transmitted through line 47 to shift the power steering valve 42 to the right and thereby permitting pump 48 to deliver fluid under pressure through lines 49 and 50 to the steering cylinders 37, 37a. The pistons in the steering cylinders 37, 37a are operated in opposite directions to turn the interconnected wheel yokes in a clockwise direction as viewed in FIG. 4, and thus steering the bridge conveyor section to the right. When the roller of the right forward linkage system leaves rail 12a the guide valves and steering valve return to an inoperative position until either right or left follower linkage systems are again actuated by contacting rails 12a. If the bridge conveyor drifts to the right, the left forward roller engages the left side rail of the continuous conveyor. The fluid under pressure from line 43 now moves through line 51 to actuate steering valve 42 to the left, as seen in FIG. 8, which allows pump 48 to deliver fluid under pressure through lines 49 and 52 to the steering cylinders 37, 37a which, in turn, steers the interconnected wheel yokes in a counterclockwise direction.

Steering control valve 53 is provided in the hydraulic system shown in FIG. 9 in order to permit steering the bridge conveyor independent of the fluid operated drive motors 46. If, for example, the control valve 53 is manually moved down, fluid under pressure is communicated to the right side of steering power valve 42 via line 54. Valve 42 is thereby shifted to the left and fluid under pressure from pump 48 is conducted to the steering cylinders 37, 37a via lines 49 and 52 in order to turn the wheel yokes counterclockwise.

While the above description is of a preferred embodiment of the present invention, it should be recognized that other structural arrangements are contemplated as being within the scope of the present invention. For example, in FIGS. 7 and 8 there is illustrated a guide follower means comprising a forward guide follower lever 61 and reverse guide follower level 61a which are similar to the follower linkage systems 21, 21a shown in FIGS. 5 and 6. Each lever comprises an upper and lower arm 62, 63 pivotally mounted on opposite sides of the wheel yoke 20'. A roller 27' is rotatably supported between the arms of each lever. A cam 34' is coupled to the follower lever 61 in the same manner as described above and is adapted to be rotated by having roller 27' contact the side rail 12a of the extensible conveyor 12 so as to move the guide follower lever. Rotation of cam 34' controls the operation of guide valve 36' by displacing roller-follower 35'. The hydraulic system for this steering apparatus is the same as the one shown in FIG. 9 except that it does not have the rotary actuators disclosed in the preferred embodiment. Therefore, both forward and reverse follower levers will be urged by springs 32' into the normal extended position shown in FIG. 8, however, pivotal action of a follower lever will effect steering control only when the associated guide valve 36' is supplied with fluid under pressure. For example, when the mobile bridge conveyor is being moved forward only the forward guide valves are supplied with fluid under pressure. Therefore even though all the follower levers are in extended position and can contact rail 12a, only the forward follower levers can effect steering control. If desired, the follower levers which are inoperative at any one time can be manually pivoted into a retracted position, as shown in the dotted position of FIG. 8, and held in this position by any conventional securing means.

Figure 5:
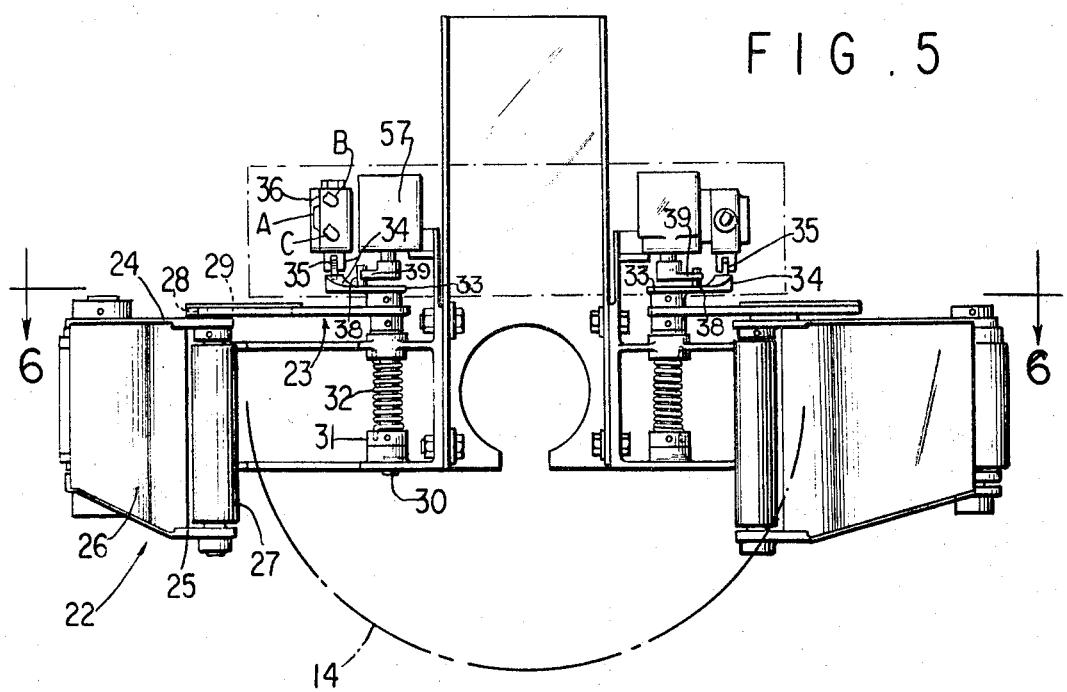
FIGURE 5 is an enlarged view taken along line 5—5 of FIGURE 4 showing one tramming wheel and the associated pair of guide follower linkage systems.
Figure 6:
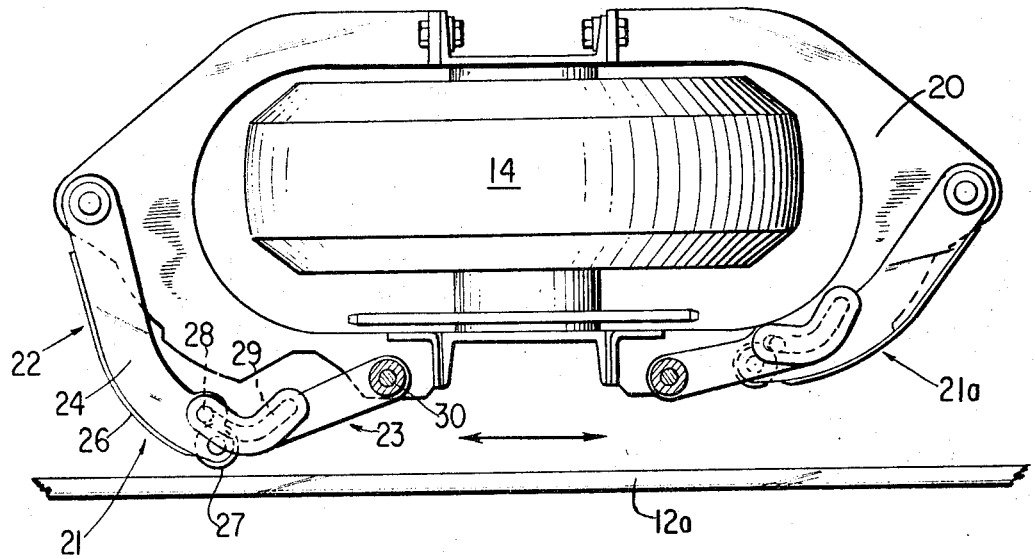
FIGURE 6 is a view taken along line 6—6 of FIGURE 5.
Figure 7:
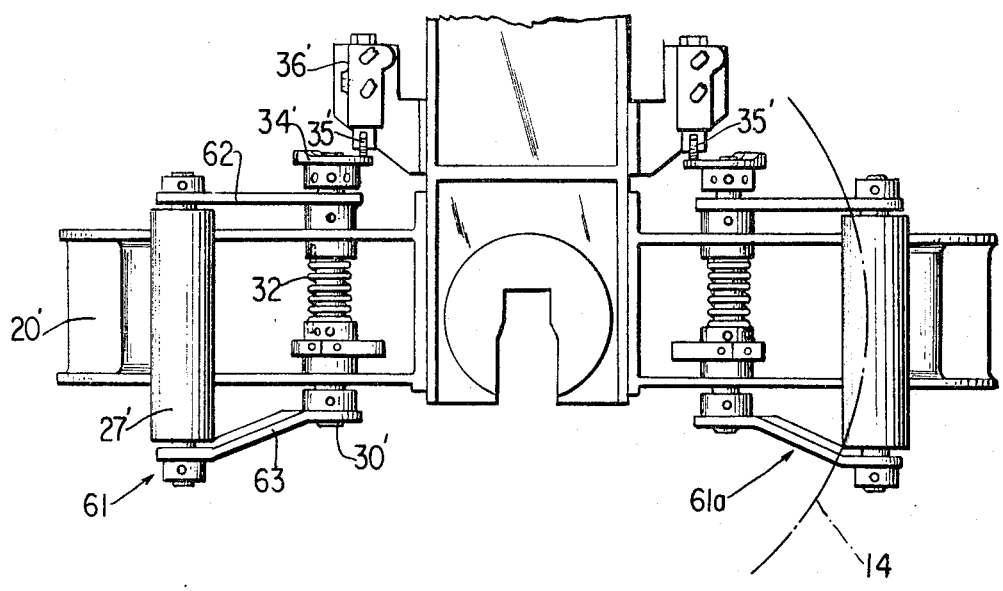
FIGURE 7 is a view similar to FIGURE 5 showing a modified form of the automatic steering unit for a tramming wheel.

It will be apparent that either of the disclosed guide follower designs control the hydraulic steering system of the mobile bridge conveyor and that either of the disclosed embodiments can employ the rotary actuators. The preferred embodiment shown in FIGS. 5 and 6 provides a rugged type of construction with the shield plate 26 acting as a guard means or bumper. The embodiment shown in FIGS. 7 and 8, on the other hand, has proven to be effective in operations where the guide roller must go over occasional large deposits of material which might become caked on the guide rails of the extensible conveyor.

Obviously many modifications and variations of the present invention are possible in light of the above teachings. It is therefore to be understood that within the scope of the appended claims the invention may be practiced otherwise than as specifically described.

What is claimed is:

1. In combination with an extensible conveyor having guide means mounted thereon and a self propelled bridge conveyor adapted to be extended and retracted over said extensible conveyor, an apparatus for automatically steering said bridge conveyor as said bridge conveyor is propelled over said extensible conveyor comprising:
    steerable wheel means coupled to said bridge conveyor and adapted to straddle said guide means;
    guide follower means coupled to said steerable wheel means and adapted to come into contact with said guide follower means;
    a hydraulic system including cam actuated valve means;
    steering means coupled to said steerable wheel means and actuated by said hydraulic system, said guide follower means controlling said hydraulic system whereby when said guide follower means contacts said guide means said guide follower means actuates said hydraulic system and said steering means in order to turn said steerable wheels in a direction which permits said guide follower means to move out of contact with said guide means.

2. The combination described in claim 1 wherein said guide follower means are on opposite sides of said guide means, each of said guide follower means comprising a forward follower linkage system and a reverse follower linkage system, said forward follower linkage adapted to control said hydraulic system only when said bridge conveyor is moving in a forward direction, said reverse follower linkage system adapted to control said hydraulic system only when said bridge conveyor is moving in the reverse direction.

3. The combination described in claim 2 wherein each of said follower linkage systems comprises a first and a second lever means pivotally attached to said steerable wheel means, said first and said second lever means coupled together so that pivotal movement of said first lever means imparts pivotal movement to said second lever, roller means rotatably connected to said first lever means for contacting said guide means, cam means coupled to said second lever means and adapted to actuate said valve means whereby when said roller contacts said guide means, said cam means actuates said hydraulic system for turning said steering means.

4. The combination described in claim 3 wherein said hydraulic system includes a rotary actuator operatively coupled to each of said follower linkage system, said hydraulic system adapted to actuate said rotary actuators for retracting said follower linkage systems when said follower linkage systems are not controlling said hydraulic system.

5. The combination described in claim 1 wherein said guide follower means are on opposite sides of said guide means, each of said guide follower means comprising a forward follower lever means and a reverse follower lever means, said forward follower lever means adapted to control said hydraulic system only when said bridge conveyor is moving in a forward direction, said reverse follower lever means adapted to control said hydraulic system only when said bridge conveyor is moving in the reverse direction.

6. The combination described in claim 5 wherein each of said follower lever means comprises an upper and lower arm pivotally attached to said steerable wheel means and a roller means rotatably connected between said upper and lower arm, cam means actuated by said first and second lever arms, said cam means controlling said hydraulic system.

7. Apparatus for automatically steering a mobile conveyor along a guide means defining a path to be traveled in either a forward or reverse direction by said mobile conveyor; said apparatus having steerable means coupled to said mobile conveyor for changing the travel direction of said mobile conveyor, a system adapted to actuate said steerable means, and guide follower means coupled to said mobile conveyor and adapted to control said system upon movement of said mobile conveyor relative said guide means so that said guide follower means contacts said guide means, the improvement comprising:
    said guide follower means having a forward follower means and a reverse follower means, each of said follower means adapted to control said system;
    said system having a control means which permits the forward follower means to control said system only when said mobile conveyor is moving in a forward direction and which permits the reverse follower means to control said system only when said mobile conveyor is moving in a reverse direction.

8. The improvement described in claim 7 wherein both of said follower means are movable between extended and retracted positions and which improvement is further characterized by retracting means for controlling said guide follower means so that said forward follower means is retracted when said mobile conveyor travels in a reverse direction and so that said reverse follower means is retracted when said mobile conveyor travels in a forward direction.

9. The improvement described in claim 7 wherein both of said follower means are movable between extended and retracted positions, said system includes a rotary actuator operatively coupled to each of said follower means for retracting said follower means, said system adapted to control said rotary actuators so that said forward follower means is retracted when said mobile conveyor travels in a reverse direction and so that said reverse follower means is retracted when said mobile conveyor travels in a forward direction.

10. Apparatus as defined in claim 9 wherein each of said follower means comprise a first and a second lever means pivotally attached to said steerable wheel means, said first and said second lever means coupled together so that pivotal movement of said first lever imparts pivotal movement to said second lever, roller means rotatably connected to said first lever means for contacting the guide means.

References Cited

UNITED STATES PATENTS

| 2,424,288 | 7/1947 | Severy | 180—79.1 |
| 2,780,451 | 2/1957 | Alspaugh | 198—92 |

RICHARD E. AEGERTER, *Primary Examiner.*

U.S. Cl. X.R.

180—79.2